(12) United States Patent
Chen (10) Patent No.: US 6,961,391 B2
(45) Date of Patent: Nov. 1, 2005

(54) SIGNAL PROCESSOR USED FOR SYMBOL RECOVERY AND METHODS THEREIN

(75) Inventor: Weizhong Chen, Keller, TX (US)

(73) Assignee: Motorola, Inc., Schaumburg, IL (US)

( * ) Notice: Subject to any disclaimer, the term of this patent is extended or adjusted under 35 U.S.C. 154(b) by 767 days.

(21) Appl. No.: 09/822,598

(22) Filed: Mar. 30, 2001

(65) Prior Publication Data

US 2002/0141506 A1 Oct. 3, 2002

(51) Int. Cl.[7] ............................................. H03M 13/03
(52) U.S. Cl. ..................... 375/341; 375/262; 375/265; 714/792; 714/796
(58) Field of Search .................. 375/262, 265, 375/340, 341; 714/786, 792, 794, 795, 796

(56) References Cited

U.S. PATENT DOCUMENTS

| | | | |
|---|---|---|---|
| 5,577,068 A | 11/1996 | Bottomley et al. | ......... 375/232 |
| 5,729,558 A * | 3/1998 | Mobin | ......... 714/795 |
| 6,088,404 A * | 7/2000 | Jekal | ......... 375/341 |
| 6,690,739 B1 * | 2/2004 | Mui | ......... 375/265 |

FOREIGN PATENT DOCUMENTS

| | | | |
|---|---|---|---|
| WO | WO 99/04537 | 1/1999 | ........ H04L 25/03 |
| WO | WO96/16483 | 7/1999 | ........ H03M 25/03 |
| WO | WO99/33235 | 7/1999 | ........ H04L 25/03 |

* cited by examiner

Primary Examiner—Khai Tran
Assistant Examiner—David B. Lugo
(74) Attorney, Agent, or Firm—Hisashi D. Watanabe (57) ABSTRACT

A signal processor and method therein that is arranged and constructed to recover a sequence of symbols from a received signal is discussed. The processor includes a symbol selector for selecting a symbol based on the received signal over a time period including previous symbol periods, said symbol period, and a number of additional symbol periods, where said number of additional symbol periods depends on the inter symbol interference associated with the received signal. The processor utilizes an MLSE approach that is adapted to be especially calculation efficient.

20 Claims, 4 Drawing Sheets

SIGNAL PROCESSOR USED FOR SYMBOL RECOVERY AND METHODS THEREIN

FIELD OF THE INVENTION

The present invention concerns communications systems and signal processors therein utilized for symbol recovery, and more specifically signal processor that are particularly efficient at performing symbol recovery.

BACKGROUND OF THE INVENTION

Various techniques for symbol recovery are known but most are complex in terms of structure or operation, often requiring extensive circuitry or processing resources to accomplish there tasks. This is due in part to the many ways a base band signal that needs to be transmitted can be corrupted prior to being presented once again as a base band signal to the apparatus responsible for symbol recovery. This corruption can result from properties of the transmitters and receivers as well phenomenon that occur or impact the transmission channel. For example there will be frequency differences and timing differences between the transmitters and receivers. Both will have some degree of filtering that can have an adverse impact on the received signal. Additionally the channel will be subject to various known forms of interference including multipath conditions. In the end the signal processors responsible for symbol recovery will have to account for each of these possible problems and this can result in very complex arrangements which are energy intensive. This is a problem for small probably portable battery powered equipment. Additionally this complexity normally is costly in economic terms so very cost sensitive applications suffer.

One known approach for symbol recovery is a maximum likelihood sequence estimator (MLSE) which essentially attempts to compare the received signal to that which would be expected for possible sequences of symbols. This has been found to be useful when a signal is subject to inter symbol interference (ISI) sometimes also known as delay spread or symbol dispersion. Generally this is a known phenomenon where one symbol will impact or interfere with or corrupt symbols in subsequent symbol periods. Usually some probability is assessed for each sequence and one is eventually selected based on this probability or likelihood. Having selected the sequence the symbols will be recovered as the ones corresponding to the selected sequence. These operations of determining probabilities, selecting sequences and thus symbols is often accomplished very effectively with a technique normally referred to as a Viterbi decision process or search. While effective the processing capacity or circuit complexity for accomplishing a Viterbi search can be excessive for economically sensitive applications particularly when long data packets must be processed. Additionally this approach will introduce a latency in symbol recovery that can be excessive. This results from having to wait until a sequence is selected before the first symbol is selected. While techniques are known for helping with these complexity and latency concerns none are known that are effective enough for particularly sensitive applications.

What is needed is a low cost low power elegant method and apparatus for recovering symbols in a system where the symbols are subject to ISI.

BRIEF DESCRIPTION OF THE DRAWINGS

The accompanying figures, where like reference numerals refer to identical or functionally-similar elements throughout the separate views and which are incorporated in and form part of the specification, further illustrate various embodiments in accordance with the present invention. The figures together with the detailed description, hereinafter below, serve to explain various principles and advantages in accordance with the present invention.

DETAILED DESCRIPTION OF A PREFERRED EMBODIMENT

In overview form the present disclosure concerns communications systems and signal processors therein for performing symbol recovery in an inventive, power and processing efficient fashion. Such signal processors may be especially useful in equipment such as receivers operating in certain personal area communications systems such as Bluetooth or Home RF and the like. These systems represent an application for symbol recovery that may be especially sensitive to economic considerations. As further discussed below various inventive principles and combinations thereof are advantageously employed to provide symbol recovery and thus communications services for communications units operating on such systems provided these principles or equivalents are utilized.

The instant disclosure is provided to further explain in an enabling fashion the best modes of making and using various embodiments in accordance with the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, top and bottom, and the like are used solely to distinguish one from another entity or action without necessarily requiring or implying any actual such relationship or order between such entities or actions. Much of the inventive functionality and many of the inventive principles are best implemented with or in software programs or instructions. It is expected that one of ordinary skill, notwithstanding possibly significant effort and many design choices motivated by, for example, available time, current technology, and economic considerations, when guided by the concepts and principles disclosed herein, will be readily capable of generating such software instructions and programs with minimal experimentation. Therefore further discussion of such software, if any, will be limited in the interest of brevity and minimization of any risk of obscuring the principles and concepts in accordance with the present invention.

Figure 1:
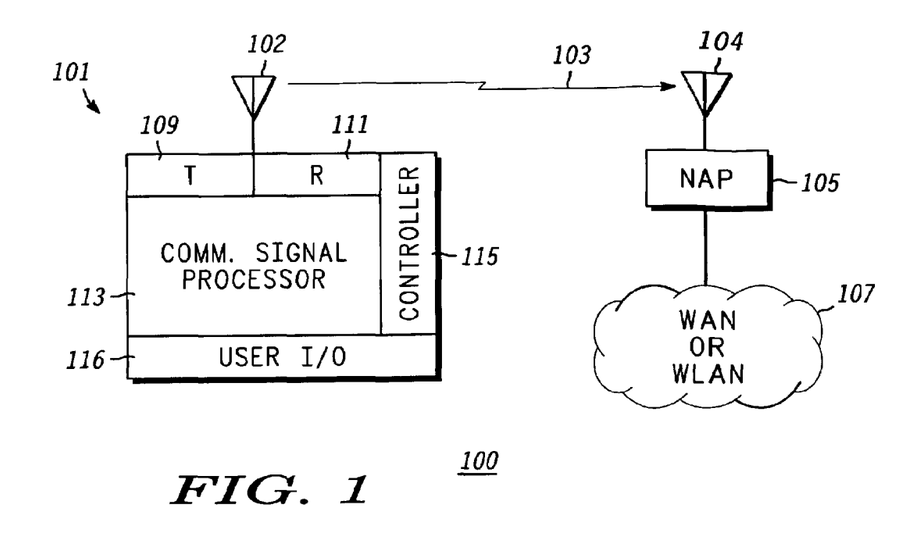
FIG. 1 depicts, in a simplified and representative form, a preferred embodiment of a communications system in accordance with the present invention.

The present disclosure will discuss various embodiments in accordance with the invention. These embodiments include methods, signal processors, receivers, and communications systems employing each or all of the aforesaid. The system diagram of FIG. 1 will be used to lay the groundwork for a deeper understanding of the present invention and advantages thereof. FIG. 1 in large part and at the simplified level depicted is a representative diagram of a communications system 100. An example of such a system is a known Bluetooth local area network (LAN) or wireless LAN (WLAN), and will serve to explain the problems and certain inventive solutions thereto according to the present invention.

First some minimal information concerning the Bluetooth system is appropriate. Generally the Bluetooth system is a frequency hopping system employing time division duplex operation operating in the 2.4 GHz frequency range. Essentially, a communications unit in a Bluetooth system alternates between receiving on one time slot and transmitting on the next slot. The modulation employed is two state frequency shift keying so each symbol may be represented as a 1 or 0. The raw data rate in a Bluetooth system is one million symbols per second and the number of symbols for any one packet or received time slot is variable but can be as much as 2761 symbols.

FIG. 1 depicts, in a simplified and representative form, a preferred embodiment of a communications system such as a Bluetooth wireless local area system or network (WLAN) in accordance with the present invention. The system depicts a communications unit 101 with an antenna 102 in communications via a channel 103 with an antenna 104 thus a network access point (NAP) 105. The NAP 105 is part of or coupled to a wide area network or wireless wide area network 107. As one of a multitude of possible examples evident to one skilled in the art the communications unit 101 could be a personal digital assistant and the NAP 105 a cellular phone with the WLAN the known and extended cellular phone system. In this example the wireless channel 103 has replaced a wire that would normally be used, much as was expected from the initial visions for the Bluetooth system.

Figure 2:
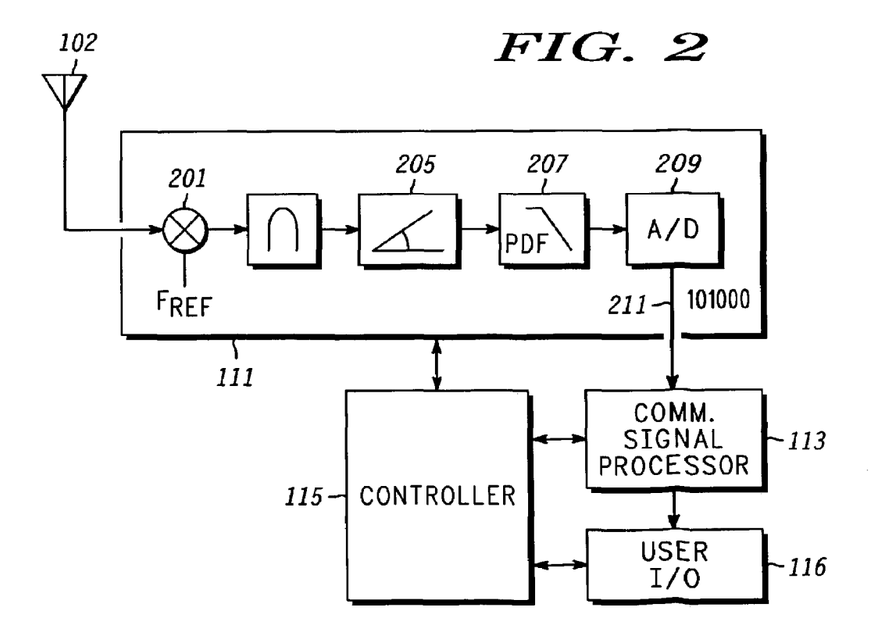
FIG. 2 depicts, in a simplified block diagram form, a receiver portion of a communications unit suitable for use in the system of FIG. 1 and in accordance with the present invention.

Referring to the block diagram of FIG. 2, where like reference numerals refer to like entities, a more detailed explanation of the receiver 111 and communications signal processor 113 will be undertaken. The receiver 111 includes a down converter or mixer 201 for translating the radio frequency signal to a lower or intermediate frequency signal. This lower frequency signal after suitable amplification is applied to a frequency discriminator 205 which converts the frequency variations of the applied signal to an analog base band signal. This analog signal is filtered in a low pass post detection filter (PDF) 207 to remove high frequency components created by or magnified by the discriminator 205. The output of the PDF 207 is applied to an analog to digital converter (A/D) 209 that in the preferred form provides 4 samples, each of 4 or more bits, for each symbol period or 4 million samples per second at the output 211. These samples are coupled to the communications signal processor 113. The balance of FIG. 2 duplicates the above discussions of FIG. 1.

Referring to the block diagram of FIG. 2, where like reference numerals refer to like entities, a more detailed explanation of the receiver 111 and communications signal processor 113 will be undertaken. The receiver 111 includes a down converter or mixer 201 for translating the radio frequency signal to a lower or intermediate frequency signal. This lower frequency signal after suitable amplification is applied to a frequency discriminator 205 which converts the frequency variations of the applied signal to an analog base band signal. This analog signal is filtered in a low pass post detection filter (PDF) 207 to remove high frequency components created by or magnified by the discriminator 205. The output of the PDF 207 is applied to an analog to digital converter (A/D) 209 that in the preferred form provides 4 samples, each of 4 or more bits, for each symbol period or 4 million samples per second at the output 211. These samples are coupled to the communications signal processor 213. The balance of FIG. 2 duplicates the above discussions of FIG. 1.

Figure 3:
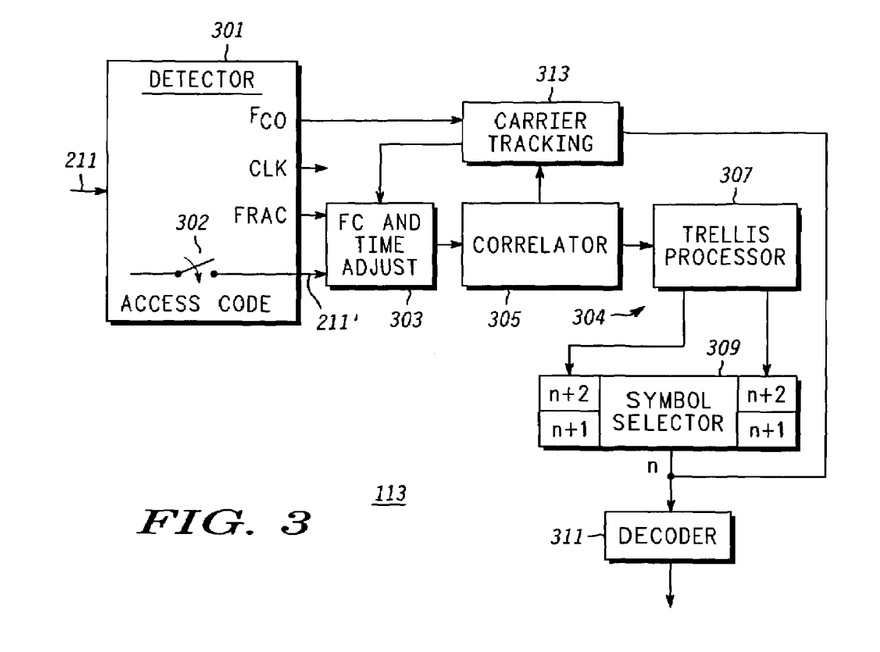
FIG. 3 depicts, in a more detailed block diagram form, a communications signal processor used within the communications unit of FIG. 2 for symbol recovery in accordance with the present invention.

Referring to FIG. 3 a more detailed block diagram for the receive portion of the communications signal processor 113 will be reviewed. The sample stream from the A/D is applied to a detector 301. Detector 301 processes the samples corresponding to a sync pattern, preferably the first 72 symbols to determine whether an access code, essentially the address of the communications unit, is present. When the access code is detected the switch 302 is closed and the samples, as processed (re-sampled) by the detector, are routed from the detector 301 to a signal processor 304. If the access code is detected the detector 301 further determines timing and carrier synchronization. This provides an initial carrier estimation $f_{co}$, and timing estimation, specifically CLX. and FRAC for the first symbol to be recovered. CLK is the sample index of the incoming samples and FRAC is a Fraction of a sample. The particulars of the detector 301 can be found in co-pending application Ser. No. 09/709,690, now U.S. Pat. No. 6,424,673, by Chen et al., filed on Nov. 10, 2000 and titled METHOD AND APPARATUS IN A WIRELESS COMMUNICATION SYSTEM FOR FACILITATING DETECTION OF, AND SYNCHRONIZATION WITH, A PREDETERMINED SYNCHRONIZATION SIGNAL, assigned to the same assignee as here and hereby incorporated herein in its entirety. For various performance motivated reasons the preferred receiver architecture including the communications signal processor and more specifically the signal processor was chosen to be a maximum Likelihood sequence estimator (MLSE). This is discussed in co-pending application Ser. No. 09/794,285, by Chen filed on Feb. 27, 2001 and titled APPARATUS FOR RECEIVING AND RECOVERING FREQUENCY SHIFT KEYED SYMBOLS, assigned to the same assignee as here and hereby incorporated herein in its entirety.

This disclosure will focus more on the inventive principles and concepts or specifics of the operation and function and preferred embodiment of this signal processor or an embodiment of a portion of this architecture. As a quick overview the samples of the received signal are coupled to the signal processor 304 that includes a frequency and phase or timing adjustment function 303 coupled to a correlator 305 that is coupled to a trellis processor 307 and then to a symbol selector 309. Lastly a carrier tracking function 313 is coupled to the detector 301, correlator 305, and the output of the symbol selector 309 and provides a carrier adjustment input to the adjustment function 303. The adjustment function provides adjusted samples to the correlator 305. The correlator performs a correlation between 4 samples of the received signal and a plurality of templates, each comprised of 4 predetermined values, where the templates each correspond to what would be the expected received signal samples for each possible symbol or symbol state transition. These correlations are provided to the trellis processor 307. The trellis processor determines or calculates a metric or weight for a path corresponding to each possible branch from each symbol state to all others for each symbol period and selects the better path including corresponding branch that terminates at each symbol state. These paths and respective relative weights are provided to the symbol selector 309. The symbol selector selects a symbol for a given symbol period n to be the symbol corresponding to the better path metric at a later symbol period n+l, where l=2 in the preferred embodiment. These symbols are coupled to a decoder 311 operating in known fashion and according to the Bluetooth standards in the preferred embodiment for decoding the particular symbols. The decoder 311 will not be further discussed herein, however, the operation and function of each of the other entities will be explained in more detail below with reference to FIG. 4. However it is advisable to first explain the symbol transition diagram 500 of FIG. 5.

Figure 5:
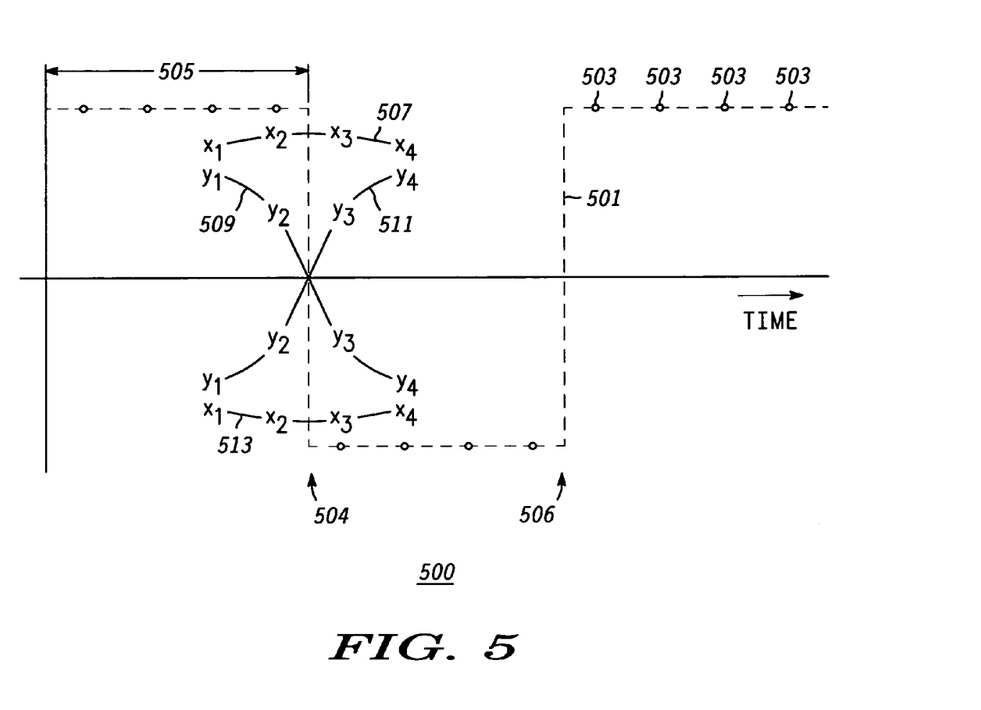
FIG. 5 depicts a symbol diagram suitable for explaining the operation of the FIG. 4 signal processor.

Referring to FIG. 5 a dashed line 501 depicts three "ideal" symbols each having four samples 503 where these samples, by observation, are taken at intervals of ¼ of the symbol period 505 beginning at ⅛ of the symbol period. Additionally shown are two symbol transitions 504, 506, respectively, from a 1 to a 0 and the other from a 0 to a 1. In addition four templates 507, 509, 511, and 513 are depicted. These templates represent the 4 possible received signals that are expected given that the respective symbol transition occurs. The departure of the templates from the ideal symbol is due to various channel characteristics as well as filtering that is performed within the receiver and the resultant inter symbol interference (ISI) that will be present. Template 507 includes four predetermined values $x_1$–$x_4$ that correspond to four sample points on the received signal. This template represents the expected received signal when adjacent symbols are both 1. Similarly template 509 has four predetermined values $y_1$–$y_4$ and corresponds to the expected received signal when a 1 to 0 symbol transition occurs. Template 511 with the four predetermined v points corresponds to a 0 to 1 symbol transition and template 513 with the four predetermined u values corresponds to a 0 to 0 symbol transition. By observation these 16 predetermined values can be represented by only four values namely $x_1$, $x_2$, $y_1$, and $y_2$ as all others are equal to one of these four or the negative of one of these four.

Turning to an overview we note that the signal processor 304 is arranged and constructed to recover a sequence of symbols from a received signal. From a summary perspective the signal processor comprises a symbol selector for selecting a symbol based on the received signal over a time period including previous symbol periods, said symbol period, and a number of additional symbol periods. The number of additional symbol periods depends on the inter symbol interference associated with the received signal. In a preferred form the number of additional symbol periods is equal to two. Thus one advantage of the present inventive signal processor and methods therein becomes clear. Namely, the maximum latency for a symbol selection with this system is two symbol periods rather than the complete sequence with a length up to 2761 symbols. The required storage for potential path information is similarly dramatically reduced over various known systems.

The signal processor, preferably further includes a trellis processor for providing, for each symbol period, the symbol selector with one surviving path to each of a plurality of symbol states. This plurality of symbol states corresponds one to one to a plurality of symbols, here a 1 and a 0. The one surviving path include a sequence of branches, one branch for each symbol period where each branch corresponds to a transition from one to another of the plurality of symbol states. The one surviving path to each of the plurality of symbol states further includes a path metric and the symbol selector selects a symbol for the number of additional symbol periods earlier or the symbol time prior to the additional symbol periods that corresponds to the one surviving path having or that has the better path metric after the additional symbol periods.

Basically the typical path metric is a cumulative metric where all the weights or metrics for each branch are summed together. In order to limit the range of a preferred path metric and because only the relative size of the metric matters the trellis processor acting as a metric calculator will provide the path metric as an adjusted metric where each of the path metrics have the same adjustment as the adjusted metric. For example in the preferred form with two surviving paths after each symbol period one terminating with the symbol state 0 and one with the symbol state 1 the path metric for the symbol state 0 is subtracted from each path metric leaving the path at 0 with a metric of 0 and the path at 1 with a metric equal to the difference between the two surviving paths. This approach simplifies the calculations is the preferred form. In the general case where a multiplicity of symbol states must be considered another approach would be to subtract a constant, such as the average expected branch metric from each path, although taking a difference between each path and a chosen path metric will also operate to keep the path metric for all surviving paths bounded.

The trellis processor preferably determines the one surviving path according to a metric for each of a plurality of paths to each of the plurality of symbol states. The metric will correspond to a correlation between the received signal and a template for each branch that is part of each of a plurality of paths and will further correspond to a half energy of the template for the each branch in a preferred form. The correlations are provided to the trellis processor by the correlator for each symbol period and is a correlation between the received signal for the symbol period and each of a plurality of templates where each of the plurality of templates corresponds to a possible transition from one to another of the plurality of symbol states. Preferably the plurality of templates is selected to facilitate providing the correlations as noted with reference to FIG. 5 and further explained below referencing FIG. 4.

In the preferred form the signal processor selects symbols for a received signal that is a Bluetooth signal using 2 state frequency shift keyed modulation, a variable length packet size, and the number of additional symbol periods is two. The received signal is sampled four times per symbol period with the samples spaced at ¼ of the symbol period and a first sample spaced at ⅛ of the symbol period from the edge of the symbol as determined by the CLK adjusted by FRAC from detector 301. Each correlation is performed on four samples spaced across a symbol transition. The signal processor also includes means for carrier error correction that determines the difference between an expected received signal based on the sequence of symbols recovered and the actual received signal as now corrected and uses the difference to provide carrier error correction.

In a different but perhaps more comprehensive view the signal processor 304 is arranged and constructed to recover a sequence of symbols from a received signal. The received signal is preferably a Bluetooth signal using 2 state frequency shift keyed modulation and a variable length packet size. The signal processor includes a correlator 305 for providing a plurality of correlations between a received signal and a plurality of corresponding templates for each symbol period, where each template corresponds to a possible signal transition from a first symbol to a second symbol within a plurality of symbols or symbol states, here preferably two such symbol states.

Further included is a trellis processor 307 for assigning weights or metrics to a plurality of branches on a trellis for each symbol period. The metrics correspond to the plurality of correlations. The trellis processor further, for each symbol time, provides a path and a composite weight or metric for each node and trims or discards all other paths that terminate at each node. Each node corresponds to one symbol of the plurality of symbols. The composite metric corresponds to the one of the metrics assigned to a one of the plurality of branches and a previous composite weight associated with a previous node where the one of the plurality of branches originated. The composite weight for the path provided will be better than any other composite weights corresponding to the other branches thus paths and the one of the plurality of branches is the latest branch in the surviving path.

Also included is a symbol selector, responsive to the path and the composite weight for each node or each symbol state, for selecting the path having a better composite weight and for selecting a symbol corresponding to a node on the path at an earlier symbol time period, where the earlier symbol time period is dependent on inter symbol interference associated with the received signal. In the preferred Bluetooth form with the chosen receiver technology the symbol is selected two symbol time periods earlier.

As noted above it is advantageous to limit the range of the metrics associated with the surviving paths and a preferred way of accomplishing this is for the trellis processor to provide the composite metric as a difference metric that represents the difference between composite weights for the surviving path for or to each node. Again the plurality of templates should be selected to facilitate providing the correlations such as the templates of FIG. 5. Preferably the signal processor also includes the earlier noted means for carrier error correction that determines the difference between an expected received signal based on the sequence of symbols recovered and the received signal and uses the difference to provide carrier error correction. It will be recognized that the above noted functions lend themselves to a digital signal processor embodiment and that all can be readily accomplished in such a processor with limited capacity. Equally appropriate and preferred is practicing these processes or functions in a custom or semi custom integrated circuit such as a gate array or the like.

A preferred method embodiment in accordance with the present invention can be practiced in many structural forms and viewed as the process steps explained above. In sum the method is one for recovering a sequence of symbols from a received signal that includes selecting a symbol based on the received signal over a time period including previous symbol periods, the symbol period, and a number of additional symbol periods, where the number of additional symbol periods depends on the inter symbol interference (ISI) associated with the received signal. Preferably and based on experimental results with a Bluetooth signal simulating the ISI expected two additional symbol periods is appropriate.

Pursuant to selecting the symbol one surviving path to each of a plurality of symbol states or symbols is provided where each path includes a sequence of branches, one branch for each symbol period that corresponds to a transition from one to another of the plurality of symbols. To provide or determine the surviving path a path metric is provided or determined for each path and the surviving path for or to each symbol state is selected based on a better path metric. The one surviving path having the better path metric is determined from amongst all surviving paths and a symbol that lies on this path at the number of additional symbols earlier is selected for that earlier symbol period. The metrics for each path correspond to correlations between the received signal and a template representative of potential symbol transitions. To control the range of the path metrics each will be adjusted by an identical factor from time to time, preferably each symbol period.

Figure 4:
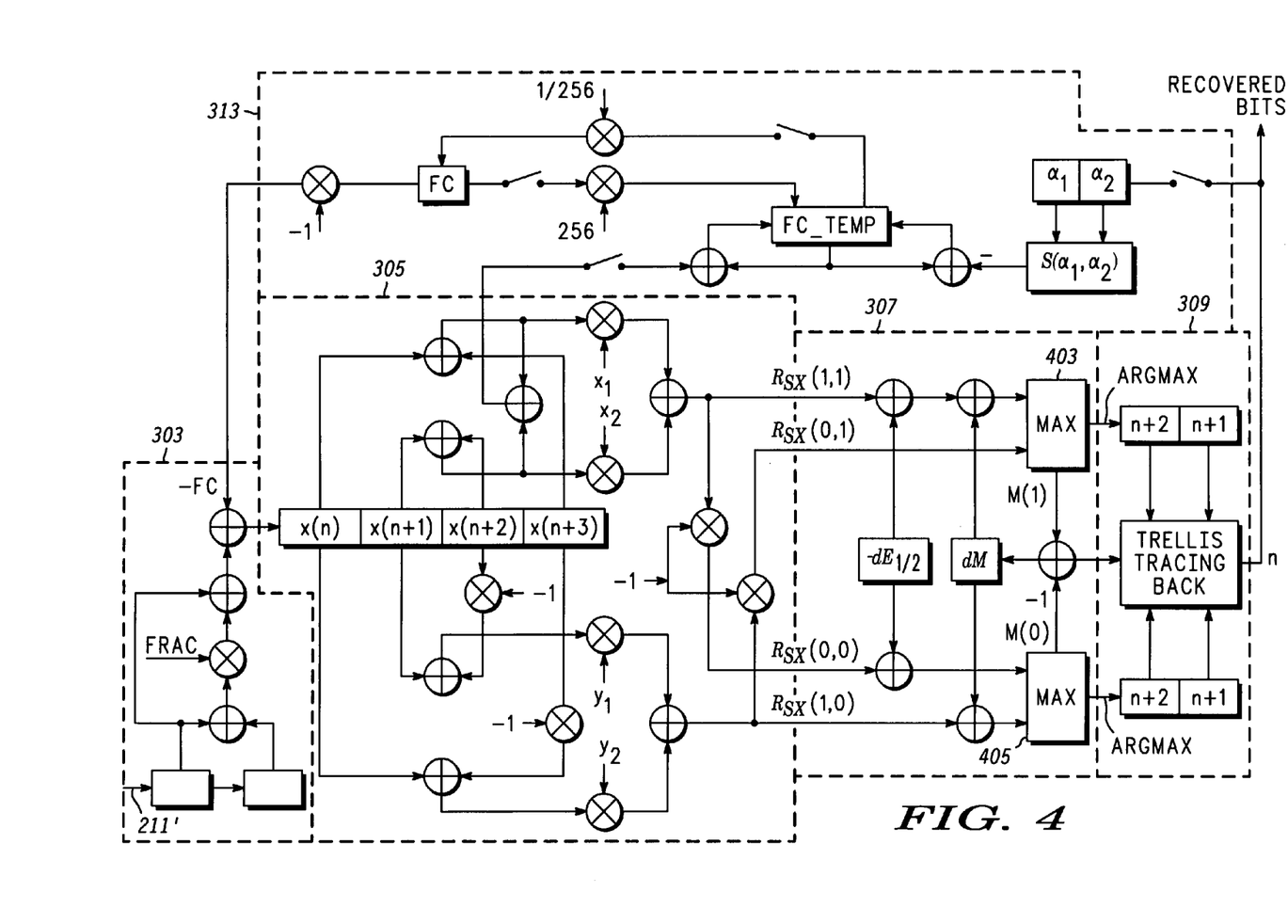
FIG. 4 depicts a more detailed functional block diagram of a preferred embodiment of the signal processor of FIG. 3 in accordance with the present invention.

Referring to the FIG. 4 functional diagram the 4 bit samples at a rate of 4 million samples per second is provided at input 211'. The functional circuitry within the dotted box 303 provides the frequency and timing adjustments. The output samples as adjusted are provided to the correlator in box 305.

The correlator forms a summation over each of the products of the, preferably, four samples of the received signal $x(n)-x(n+3)$ and the appropriate corresponding template values to provide four correlations. By observation and because of the symmetry noted in FIG. 5 forming, finding, determining, or providing the correlation $R_{SX}(1,1)$ in FIG. 4 that corresponds to a 1 to 1 symbol transition amounts to forming the sum of the first and fourth samples and the product of this sum and the template value $x_1$ and adding that to the product of the sum of the second and third samples and the template value $x_2$. Multiplying this correlation by $-1$ gives the correlation $R_{SX}(0,0)$ that corresponds to a 0 to 0 symbol transition. Similarly the correlations $R_{SX}(0,1)$ and $R_{SX}(1,0)$ corresponding to a 0 to 1 and a 1 to 0 transition are provided. These correlations are provided to the trellis processor 307.

The trellis processor subtracts a constant generally referred to as the half energy difference $dE_{1/2}$ from the correlations where the symbol has not changed (1 to 1 and 0 to 0). The Half Energy difference can be shown to be equal to ½ of the sum of the four template values for a 1 to 1 transition squared less ½ of the sum of four template values for a 1 to 0 transition squared. Then the trellis processor adds a difference metric dM to the correlations, specifically $R_{SX}(1,1)$ and $R_{SX}(1,0)$, when the current branch originated at a 1 symbol. This dM is provided from a later operation but represent the difference between the cumulative metric for a surviving path terminating at the 1 symbol and the cumulative metric for the surviving path terminating at the 0 symbol. These cumulative metrics corresponding to the correlations and the half energy and the previous cumulative metric or difference are supplied to a respective maximum function. The two paths terminating at a one symbol (transition from 1 to 1 or from 0 to 1) have their respective adjusted metrics compared at 403 and the better survives and its metric is provided as M(1) and the symbol state or symbol from which the latest branch on the surviving path originated is output as the argmax. If the surviving path is the 1 to 1 transition then a 1 is output and if a 0 to 1 then a 0 is output. Similarly the two paths terminating at a zero symbol (transition from 0 to 0 or from 1 to 0) have their respective metrics compared at 405 and the better survives and its metric is provided as M(0) and the symbol state or symbol from which the latest branch on the surviving path originated is output as the argmax. If the surviving path is the 0 to 0 transition then a 0 is output and if a 1 to 0 then a 1 is output. M(0) is subtracted from M(1) to form dM which is fed back for processing the next symbol and also supplied along with the argmaxs to the symbol selector 309.

The symbol selector 309 essentially shifts the argmaxs through a two bit shift register and selects as the nth symbol or bit the symbol or symbol state that lies on the surviving path two symbol periods later in the preferred embodiment. This is determined by tracing back along the surviving path for two symbol periods to determine the symbol from which the surviving branch originated. By way of example, suppose we want to select the nth symbol and the argmaxs from 403 for n+1 and n+2 symbol periods are each 0 and the corresponding argmaxs from 405 are 1 and 0. Suppose further that dM is greater than zero indicating that M(1) is greater than M(0) and thus that the better surviving path at the n+2 symbol period goes through or to the 1 symbol state. Looking at the n+2 argmax from 403 we find a 0 and thus know that the surviving branch originated from a 0 symbol state. Thus at the n+1 symbol time we need to look at the n+1 argmax from 405 and we see a 1 and thus know that the surviving branch corresponding to the surviving path at the n+1 symbol period originated from a 1 symbol state. The symbol selected for the nth symbol period is therefore a 1. For this example, the symbol selection boils down to determining which of the n+1 argmaxs should be output as the recovered symbol or bit and the other is discarded.

The selected or recovered symbols are supplied to the decoder as well as a carrier tracking function 313. The carrier tacking apparatus compares the received signal samples with the expected received signal (template values) from the recovered symbols and periodically provides an updated frequency error to 303. The updated frequency error is provided every 64 symbols in the preferred embodiment and this is enabled by the switches depicted.

It will be recognized that the inventive concepts and principles described above with respect to FIG. 4 can be applied not only to the 2 state system described but also to 4 or more state systems. In more complex systems the specific embodiments will vary and the particular techniques used to minimize computation resources may have to be changed but it is expected that many of the benefits realized in the preferred 2 state system would also be realized in an n state system. For example in the 2 state system described the selection of sample points and the symmetry thus provided 16 template values for 4 templates to be represented by 4 values and allowed 16 multiplications for providing the correlations to be replaced with 4 multiplications. In a four state systems with symbols a, b, c, d 16 templates including 64 values would be required but taking advantage of proper sample times would allow these templates to be represented by 16 points and a similar reduction ratio for multiplications.

Various embodiments of cost and processing efficient symbol processors and methods therein that provide for symbol selection while limiting selection latency to a number of symbol periods that is a function of inter symbol interference have been discussed and described. Such symbol processors and methods may be advantageously employed in wireless receivers for communications systems such as Bluetooth, Home RF an the like systems where economic considerations are paramount. The disclosure extends to the constituent elements or equipment comprising such systems and the methods employed thereby and therein. The inventive principles and concepts disclosed herein can advantageously be utilized in many systems to provide cost effective symbol recovery. This disclosure is intended to explain how to fashion and use various embodiments in accordance with the invention rather than to limit the true and intended scope and spirit thereof. The invention is intended to be defined solely by the appended claims, as may be amended during the pendency of this application for patent, and all equivalents thereof.

What is claimed is:

1. A signal processor arranged and constructed to recover a sequence of symbols from a received signal, comprising:
   a symbol selector for selecting a symbol based on the received signal over a time period including previous symbol periods, a current symbol period, and a number of additional symbol periods, where said number of additional symbol periods depend on an inter symbol interference associated with the received signal; and
   a trellis processor for providing, for each symbol period, said symbol selector with one surviving path to each of a plurality of symbol states, said plurality of symbol states corresponding one to one to a plurality of symbols, said one surviving path including a sequence of branches, one branch for each symbol period, said one branch corresponding to a transition from one to another of said plurality of symbol states, wherein said trellis processor determines said one surviving path according to a metric for each of a plurality of paths to each of said plurality of symbol states, said metric corresponding to a correlation between the received signal and a template for each branch that is part of said each of a plurality of paths.

2. The signal processor of claim 1 wherein said symbol is selected based on said number of additional symbol periods equaling two.

3. The signal processor of claim 1 wherein said metric further corresponds to a half energy of said template for said each branch.

4. The signal processor of claim 1 further including a means for carrier error correction that determines a difference between an expected received signal based on the sequence of symbols recovered and the received signal and uses said difference to provide carrier error correction.

5. A signal processor arranged and constructed to recover a sequence of symbols from a received signal, comprising:
   a symbol selector for selecting a symbol based on the received signal over a time period including previous symbol periods, a current symbol period, and a number of additional symbol periods, where said number of additional symbol periods depend on an inter symbol interference associated wit the received signal;
   a trellis processor for providing, for each symbol period, said symbol selector with one surviving path to each of a plurality of symbol states, said plurality of symbol states corresponding one to one to a plurality of symbols, said one surviving path including a sequence of branches, one branch for each symbol period, said one branch corresponding to a transition from one to another of said plurality of symbol states; and
   a correlator for providing to said trellis processor, for each symbol period, a correlation between the received signal for said each symbol period and each of a plurality of templates where each of said plurality of templates corresponds to a possible transition from one to another of said plurality of symbol states.

6. The signal processor of claim 5 wherein said plurality of said templates is selected to facilitate providing said correlation.

7. The signal processor of claim 5 where said received signal is a Bluetooth signal using 2 state frequency shift keyed modulation, a variable length packet size, and said number of additional symbol periods is two.

8. The signal processor of claim 5 where said received signal is sampled four times per symbol period spaced at ¼ of a symbol period with a first sample at ⅛ of a symbol period and each of said correlations is performed on four samples spaced across a symbol transition.

9. A signal processor arranged and constructed to recover a sequence of symbols from a received signal, comprising in combination:
 a correlator for providing a plurality of correlations between the received signal and a plurality of corresponding templates for each symbol period, each template corresponding to a possible transition from a first symbol to a second symbol within a plurality of symbols;
 a trellis processor for assigning metrics to a plurality of branches on a trellis for said each symbol period, said metrics corresponding to said plurality of correlations, said trellis processor further, for each symbol time, providing a path and a composite metric for each node and trimming all other paths that terminate at said each node, said each node corresponding to one symbol of said plurality of symbols, where said composite metric corresponds to a one of said metrics assigned to a one of said plurality of branches and a previous composite metric associated with a previous node where said one of said plurality of branches originated, said composite metric being better than other composite metrics corresponding to other branches of said plurality of branches, said one of said plurality of branches being a latest branch in said path; and
 a symbol selector, responsive to said path and said composite metric for each node, for selecting said path having a better composite metric and for selecting a symbol corresponding to a node on said path at a symbol time period dependent on inter symbol interference associated with the received signal.

10. The signal processor of claim 9 wherein said trellis processor provides said composite metric as a difference metric, said difference metric representing the difference between composite metrics for said path for said each node.

11. The signal processor of claim 9 wherein, said plurality of said templates are selected to facilitate providing said correlations.

12. The signal processor of claim 9 where said received signal is a Bluetooth signal using 2 state frequency shift keyed modulation and a variable length packet size.

13. The signal processor of claim 9 further including a means for carrier error correction that determines a difference between an expected received signal based on the sequence of symbols recovered and the received signal and uses said difference to provide carrier error correction.

14. A method of recovering a sequence of symbols from a received signal, including the steps of:
 selecting a symbol based on the received signal over a time period including previous symbol periods, a current symbol period, and a number of additional symbol periods, where said number of additional symbol periods depends on an inter symbol interference associated with the received signal; and
 providing, for each symbol period, one surviving path to each of a plurality of states, said plurality of states corresponding to a plurality of symbols, said one surviving path including a sequence of branches, one branch for each symbol period, said one branch corresponding to a transition from one to another of said plurality of symbols; and
 determining said one surviving path according to a metric for each of a plurality of paths to each of said plurality of states, said metric corresponding to a correlation between the received signal and a template for each branch that is part of said each of a plurality of paths.

15. The method of claim 14 wherein said step of selecting said symbol over said time period including said additional symbol periods includes two additional time periods.

16. The signal processor of claim 14 wherein said metric further corresponds to a half energy of said template for said each branch.

17. The method of claim 14 further including a step of providing, for each symbol period, said correlation and a step of selecting said templates to facilitate providing said correlation, each of said templates corresponding to a possible transition from one to another of said plurality of states.

18. The method of claim 17 where said received signal is a Bluetooth signal using 2 state frequency shift keyed modulation, a variable length packet size, and said number of additional symbol periods is two.

19. The signal processor of claim 17 where said received signal is sampled four times per symbol period spaced at ¼ of a symbol period with a first sample at ⅛ of a symbol period and each of said correlations is performed on four samples spaced across a symbol transition.

20. The method of claim 14 further including a step of determining a carrier error based on a difference between an expected received signal based on the sequence of symbols recovered and the received signal and using said difference to provide carrier error correction.

* * * * *